United States Patent [19]

Ito et al.

[11] Patent Number: 5,016,174
[45] Date of Patent: May 14, 1991

[54] DEVICE AND METHOD OF FAIL-SAFE CONTROL FOR ELECTRONICALLY CONTROLLED AUTOMATIC TRANSMISSION

[75] Inventors: Yasunobu Ito; Kenji Suzuki, both of Aichi, Japan

[73] Assignee: Aisin AW Kabushiki Kaisha, Japan

[21] Appl. No.: 280,937

[22] Filed: Dec. 7, 1988

[30] Foreign Application Priority Data

Dec. 28, 1987 [JP] Japan .............................. 62-329508

[51] Int. Cl.$^5$ ..................... B60K 41/08; G05D 17/02
[52] U.S. Cl. ................................. 364/424.1; 74/866; 74/867
[58] Field of Search ............... 364/424.1, 143, 424.01; 74/866, 867, 868, 869

[56] References Cited

U.S. PATENT DOCUMENTS

| | | | |
|---|---|---|---|
| 4,208,929 | 6/1980 | Heino | 74/731 |
| 4,283,970 | 8/1981 | Vukovich | 74/866 |
| 4,785,689 | 11/1988 | Iwatsuki et al. | 74/867 |
| 4,843,550 | 6/1989 | Kawanabe et al. | 364/424.1 |
| 4,846,021 | 7/1989 | Hamano et al. | 74/866 |
| 4,849,899 | 7/1989 | Cote et al. | 364/424.01 |
| 4,870,581 | 9/1989 | Ito et al. | 364/424.1 |

Primary Examiner—Felix D. Gruber
Attorney, Agent, or Firm—Lorusso & Loud

[57] ABSTRACT

A fail-safe control device for an electronically controlled automatic transmission mounted on a vehicle is provided with a sensor for sensing the number of revolutions input to the transmission and a sensor for sensing the number of revolutions output from the transmission or from a car speed sensor. The actual gear ratio of the transmission is calculated in accordance with the number of revolutions input to the transmission and the number of revolutions output from the transmission or from the car speed sensor each obtained from said sensors. The time taken for changing the actual gear ratio at the time of shift initiation to the fixed gear ratio after the shift is measured. A predetermined shift time which has been stored is compared with the thus-measured time for the purpose of detecting a failure of the transmission. As a result of this, a driver can take a measure such as performing an emergency control or the like, and furthermore, the failure can be displayed by a failure alarm device so that the driver can arrange for repair.

6 Claims, 3 Drawing Sheets

DEVICE AND METHOD OF FAIL-SAFE CONTROL FOR ELECTRONICALLY CONTROLLED AUTOMATIC TRANSMISSION

BACKGROUND OF THE INVENTION

The present invention relates to a fail-safe control for an electronically controlled automatic transmission to be mounted on a vehicle, and more particularly to a fail-safe control of a transmission (T/M) by detecting the shift time.

In conventional electronically controlled automatic transmissions, in general, the gear ratio of the T/M and the state of the lock-up clutch (on-or-off) are determined in response to signals representing the degree of opening of a throttle and the car speed or the number of revolutions output from the T/M so that an actuator such as a solenoid or the like secured to the T/M is controlled.

In the conventional control method, a fail-safe control against an electric failure of a sensor or the actuator is generally performed.

However, in the conventional control method, the failures in the mechanical portion of a T/M, for example, valve sticking, and slippages of friction materials are difficult to subject to a sufficient fail-safe control, and a further improvement is required for the purpose of providings a more comfortable drive.

SUMMARY OF THE INVENTION

An object of the present invention is to provide a fail-safe device control system capable of properly detecting a failure in mechanical portion of an automatic transmission, and communicating it to a driver, whereby a reliable fail-safe control can be performed and to provide a fail-safe control method.

In order to achieve the above-described objects, a fail-safe control system for an electronically controlled automatic transmission is provided according to the present invention comprising: a sensor for the number of revolutions input to the transmission; a sensor for the number of revolutions output from the transmission from a car speed sensor; means for calculating the actual gear ratio of the transmission in accordance with the number of revolutions input to the transmission and the number of revolutions output from the transmission or from the car speed; means for measuring the time taken in changing from an actual gear ration before shifting to a gear ratio fixed after shifting; and means for detecting a failure of the transmission by comparing a predetermined shift time which has been previously stored with the thus-measured time.

Furthermore, a fail-safe control method for an electronically controlled automatic transmission is provided according to the present invention which includes sensing the number of input revolutions; sensing the number of revolutions output from the transmission or from a car speed sensor; calculating actual gear ratio of the transmission in accordance with the number of revolutions input to the transmission and the number of revolutions output from the transmission or from the car speed sensor measuring time taken for shifting for the actual gear ration at the time of shift initiation until a new gear ratio is fixed after the shift; and detecting a failure of the transmission by comparing a predetermined shift time which has been previously stored with the thus-measured time.

According to the present invention, in general, in an automatic transmission, the time consumed in performing a shift change from an actual gear ratio before the shift is initiated (for example, in a case of an up-shift from a low gear to a second gear, it is the gear ratio in the low gear) to a fixed gear ratio after the transition has been performed (for example, in a case of an up-shift from a low gear to a second gear, it is the gear ratio in the second gear), (shift time) can be detected. As a result of this, by determining whether the shift time is within a region of a preferred shift time (specification) which has been previously stored or not, deterioration of the friction material and abnormality of oil pressure for controlling the T/M can be detected.

As a result of this, failures such as valve sticks, slippages of the friction materials and the like can be detected so that the failure can be communicated to a driver and a fail-safe control can be performed.

DESCRIPTION OF THE PREFERRED EMBODIMENT

An embodiment of the present invention will now be in detail described with reference to the drawings.

Figure 1:
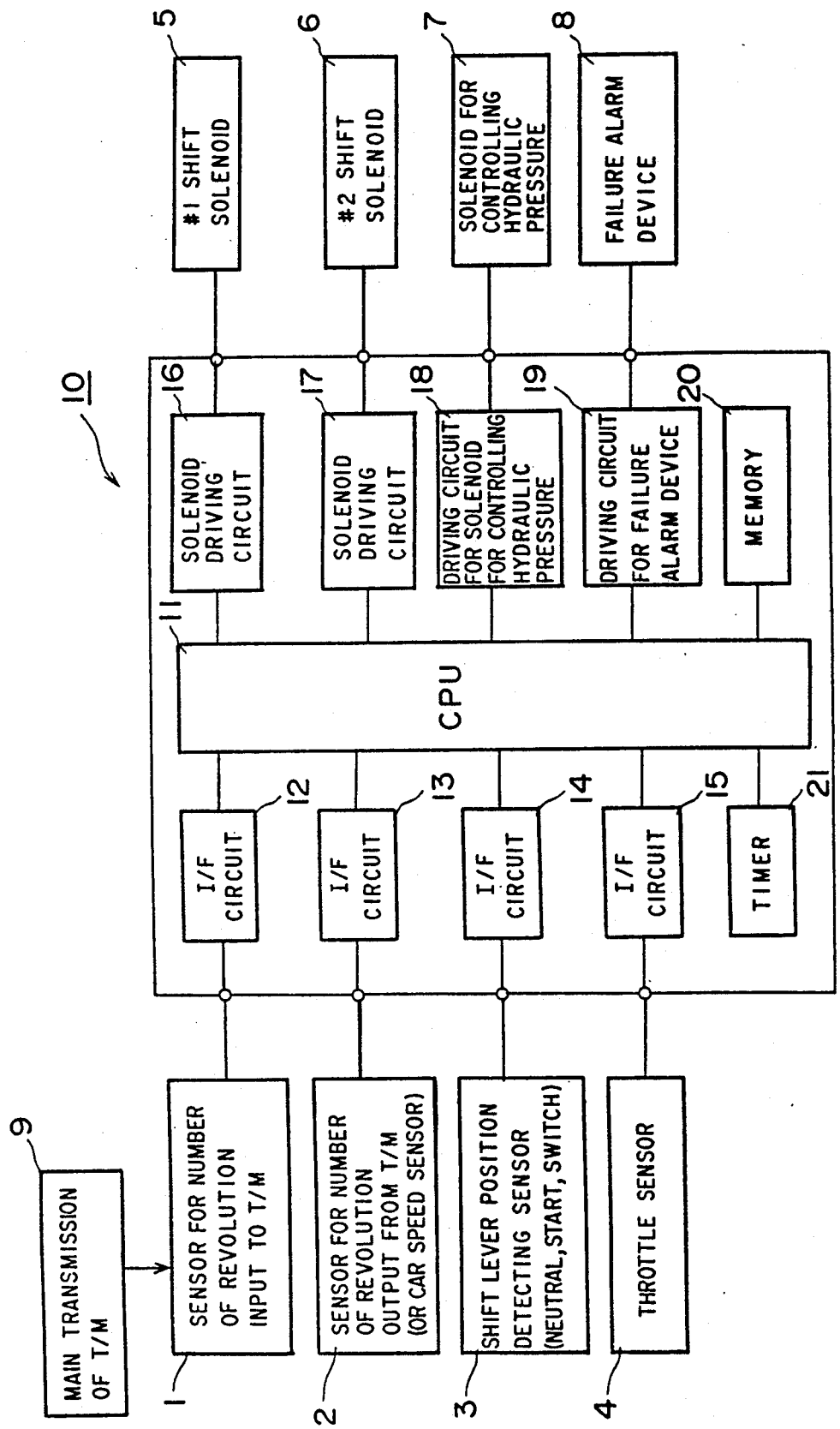
FIG. 1 is block diagram of a fail-safe control system for an electronically controlled automatic transmission according to an embodiment of the present invention.

Referring to FIG. 1, reference numeral 1 represents a sensor for the number of revolutions input to the T/M. In a case of a T/M for a transverse engined FF vehicle, the sensor 1 for the number of revoltions is included in a main transmission 9 of the T/M for the purpose of detecting the number of revolutions of a $C_1$ drum (in a case of an FR vehicle, the number of revolution of a $C_0$ drum) which is directly connected to an input shaft. Reference numeral 2 represents a sensor for the number of revolutions output from the T/M, 3 represents a shift lever position detecting sensor (neutral, start, switch), 4 represents a throttle sensor, 5 represents a first shift solenoid, 6 represents a second shift solenoid, 7 represents a solenoid for controlling hydraulic pressure, 8 represents a failure alarm device, 9 represents the main section of the T/M provided with the sensor 1 for the number of revolution input to the T/M, 10 represents an electronic control device, 11 represents a central processing unit (CPU), 12 to 15 each represent an interface circuit, 16 represents a driving circuit for the first shift solenoid 5, 17 represents a driving circuit for the second shift solenoid 6, 18 represents a driving circuit for the solenoid 7 for controlling the hydraulic pressure, 19 represents a driving circuit for the failure alarm device, 20 represents a memory, and 21 represents a timer. The above-described sensor 2 for the number of revolutions output from the T/M represents a sensor to be mounted on the T/M, however, it can be replaced by a so-called car speed sensor included in a speedometer.

In this system, in accordance with the shift lever position and the output state of the shift solenoid, the formal gear ratio is defined. Therefore, a formal gear ratio in accordance with the signal from the shift lever position detecting sensor 3 and the output state of the shift solenoids 5 and 6 is stored in a memory 20 connected to the CPU 11, and then, an actual gear ratio is calculated from the output signals from the sensor 1 for the number of revolutions input to the T/M and the sensor 2 for the number of revolutions output from the T/M. If the time required to shift from the actual gear ratio which has been previously stored to completion of the shift is not within a preferred shift time range (specification) which has been previously stored at the time of shifting the shift solenoid, it is determined that the T/M is in a failure state. A fail-safe control is arranged to be performed in accordance with this so that a mode is realized in which manual transmission driving can be performed with a shift lever or, in a case where the hydraulic pressure is electronically controlled, the mode can be shifted to an emergency mode such as setting the hydraulic pressure for controlling the T/M to a maximum level.

Furthermore, this failure can be communicated to a driver by using a failure alarm device so that repair by a dealer can be arranged.

Figure 2:
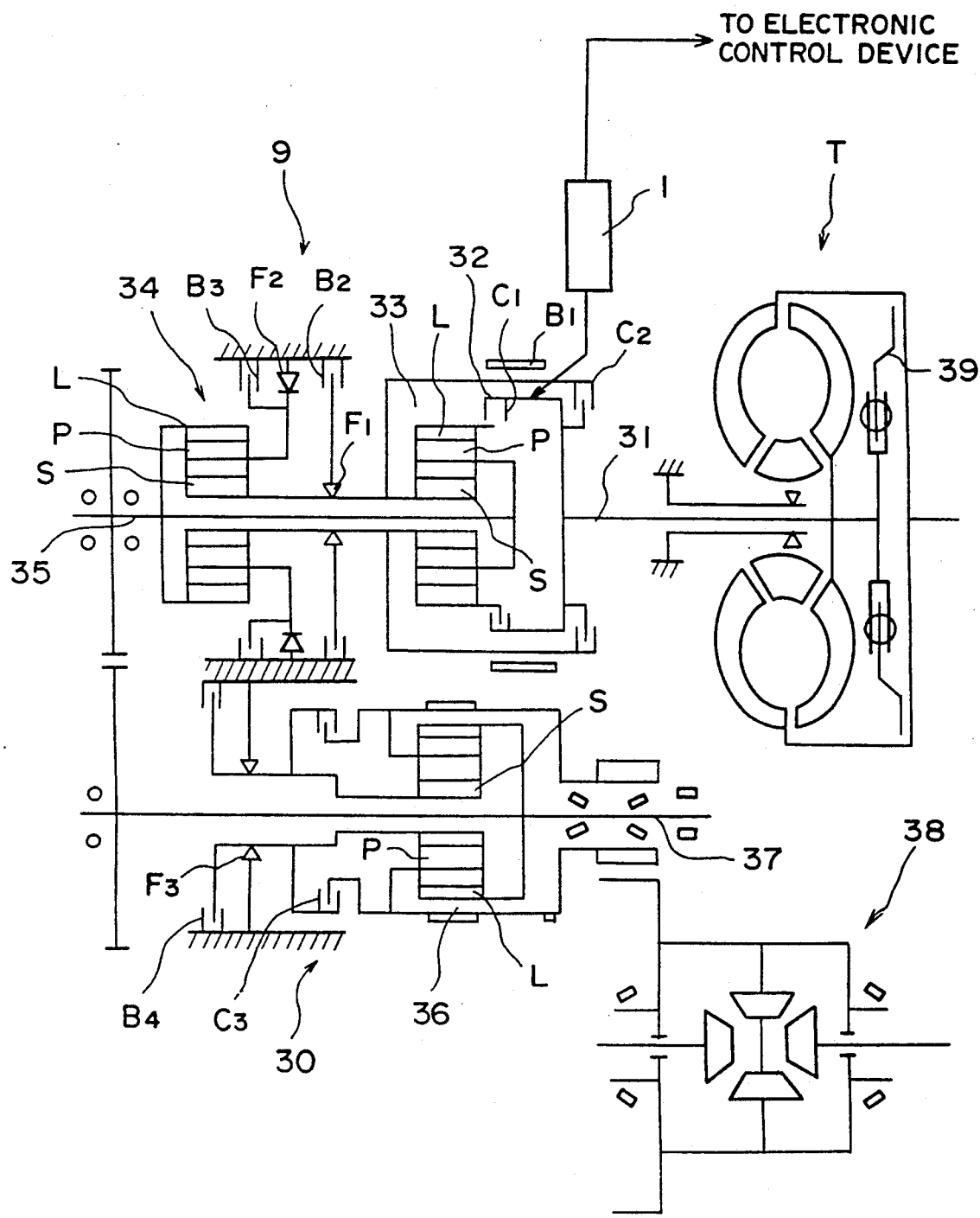
FIG. 2 is a shcematic of a T/M for a transverse engined FF vehicle provided with a sensor for sensing the number of input revolutions according to the present invention.

A T/M for a transverse engined FF vehicle provided with a sensor for the input number of revolutions according to the present invention will be described with reference to FIG. 2.

Referring to this drawing, symbol T represents a torque converter, $C_1$, $C_2$ and $C_3$ each represent a multi-disc clutch, $B_1$ represents a band brake, $B_2$, $B_3$ and $B_4$ each represent a multi-disc brake, and $F_1$, $F_2$, and $F_3$ each represent a one-way brake. Reference numeral 9 represents a main transmission, 30 represents a sub-transmission, 31 represents an input shaft, and 32 represents a $C_1$ drum directly connected to the input shaft 31 so that the number of revolutions thereof is detected by the sensor 1 for the input number of revolutions Reference numeral 33 represents a under drive mechanism $UD_1$, 34 represents a under drive mechanism $UD_2$, 35 represents an intermediate shaft, 36 represents a under drive mechanism $UD_3$, 37 represents an output shaft, 38 represents a differential mechanism, and 39 represents a lock-up clutch.

As described above, since the sensor 1 for the number of revolutions input to the T/M detects the number of revolutions of the $C_1$ drum 32 directly connected to the input shaft 31 for transmitting output from the torque converter T, an accurate input number of revolutions can be obtained. Furthermore, since they can be collectively provided at the position near the electronically controlled device mounted in the front portion of the vehicle, an advantage can be obtained from the viewpoints of maintenance and reliability.

Figure 3:
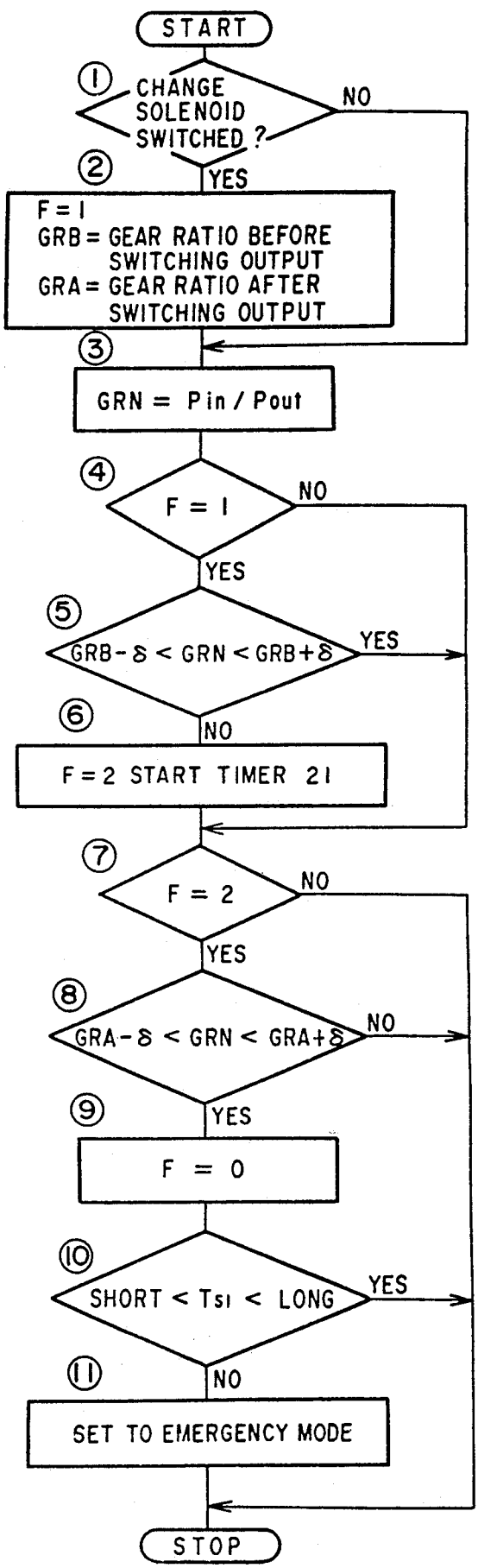
FIG. 3 is a flow chart illustrating operation of a fail-safe control system for an electronically controlled automatic transmission according to the present invention.

Operation of the fail-safe control system in this electronically controlled automatic transmission will now be described in detail with reference to FIG. 3.

First, it is determined whether the change of the shift solenoid is performed or not (step ①).

Next, in a case where the shift solenoid is changed, flag F representing the state of the transmission is set to "1", and gear ratio before GRB the output shift and gear ratio after GRA the output shift are read out (step ②). These gear ratios GRB and GRA have been previously stored in the memory 20.

Next, the present and actual gear ratio GRN is obtained by the CPU 11 by dividing the number of revolutions Rin input to the T/M obtained by the sensor 1 by the number of revolutions Rout output from the T/M obtained by the sensor 2 (step ③).

Next, it is determined whether the flag F representing the state of transmission is "1" or not (step ④).

Next, if the flag F representing the state of transmission is "1", it is determined whether the actual gear ratio GRN is as follows or not (step ⑤).

$$GRB - \delta < GRN < GRB + \delta$$

That is, judgement whether a shift has been initiated is made, wherein $\delta$ represents a constant for preventing erroneous detection.

Then, if the shift has been initiated, the flag F representing the state of transmission is set to "2", and a timer 21 for measuring the shift time is started (step ⑥).

Next, it is determined whether the flag F representing the state of transmission is "2" or not (step ⑦).

Next, if the flag F representing the state of transmission is "2", it is determined whether the actual gear ratio GRN is as follows or not.

$$GRA - \delta < GRN < GRA + \delta.$$

That is, judgement whether the shift has been completed is made (step ⑧).

Next, if it is determined that the shift has been completed, the flag F representing the state of transmission is set to "0" (step ⑨).

Next, the shift time is measured by the timer 21, and it is determined whether the shift time is as follows or not (step ⑩).

$$SHORT < T_{S1} < LONG$$

In this state, SHORT represents a specified value for the shortest shift time, while LONG represents a specified value for the longest shift time, these valves having been previously stored in the memory 20 in accordance with the degree of opening of the throttle and the type of the shift.

If the $T_{S1}$ is not within the specified range, an emergency mode is realized (step ⑪).

In this state, the emergency mode is a mode (1) in which both of the shift solenoids 5 and 6 are turned off and manual shifting can be performed, and a case (2) in which, by turning off the solenoid 7 for controlling the hydraulic pressure, the hydraulic pressure of the transmission is caused to rised to the maximum level and the capacity of the friction material or the like is increased. In this mode, the failure alarm device 8 is turned on so that the failure is communicated to the driver.

Since the structure is as described above, failures in the mechanical portion of automatic. transmission, such as sticking of a shift valve, sticking of a plunger of the shift solenoid and the slippages of the friction material due to reduction in the hydraulic pressure or the like can be properly detected and an alarm can be issued to the driver. Furthermore, a reliable fail-safe control can be performed.

The present invention is not limited to the above-described embodiment; other various modifications based on the spirit of the present invention are possible and they are not excluded from the scope of the present invention.

What is claimed is:

1. A fail-safe control system for an electronically controlled automatic transmission for use in an automobile, said transmission having a mechanical section including a plurality of friction devices engagable responsive to hydraulic pressure, said control system comprising:

(a) a first sensor for sensing the number of revolutions input to said transmission;

(b) a second sensor for sensing the number of revolutions output from said transmission or the automobile speed;

(c) means for measuring shift time elapsed between initiation of a shift from a first actual gear ratio and completion of the shift by establishing a second actual gear ratio;

(d) computing means for detecting abnormal slippage in the mechanical section of the transmission by determining that the measured shift time is outside of a predetermined range for shift time and for calculating an actual gear ratio in accordance with the numbers of revolutions sensed by said first and second sensors;

(e) means for generating an abnormality signal responsive to detection of abnormal slippage;

(f) a solenoid valve for controlling the hydraulic pressure to said mechanical section responsive to an electric command signal; and (g) means for causing said solenoid valve to be turned off, thereby raising the hydraulic pressure to a maximum level in response to said abnormality signal.

2. A fail-safe control device for an electronically controlled automatic transmission according to claim 1, wherein said number of revolutions input to said transmission is obtained by detecting the number of revolutions of a $C_1$ drum in a transverse engined vehicle.

3. A fail-safe control system in accordance with claim 1 further comprising means for communicating said abnormality signal to a driver.

4. A fail-safe control system in accordance with claim 1 wherein said computing means is a central processing unit including a memory and wherein said predetermined range for shift time is stored in said memory.

5. A fail-safe control system in accordance with claim 4 further comprising a driving circuit for said solenoid for controlling hydraulic pressure responsive to said electric command signal, said electric command signal being generated by said central processing unit responsive to operating parameters of the automobile including shift lever position and throttle position.

6. A fail-safe control method for an electronically controlled automatic transmission for use in an automobile, said transmission having a mechanical section including a plurality of friction devices engagable responsive to hydraulic pressure, said method comprising:

sensing the number of revolutions input to the transmission;

sensing the number of revolutions output from the transmission or the automobile speed;

calculating the actual gear ratio of the transmission by dividing the number of revolutions input to the transmission by the number of revolutions output from the transmission;

measuring shift time elapsed between initiation of a shift and completion of the shift;

detecting abnormal slippage in the mechanical section of the transmission by determining that the measured shift time is outside of a predetermined range for shift time;

generating an abnormality signal responsive to detection of abnormal slippage;

controlling the hydraulic pressure to said mechanical section by operation of a solenoid valve responsive to an electric command signal; and turning off said solenoid valve, thereby raising the hydraulic pressure to a maximum level, in response to said abnormality signal.

* * * * *

UNITED STATES PATENT AND TRADEMARK OFFICE
CERTIFICATE OF CORRECTION

PATENT NO. : 5,016,174
DATED : May 14, 1991
INVENTOR(S) : ITO et al

It is certified that error appears in the above-identified patent and that said Letters Patent is hereby corrected as shown below:

Col. 1, line 33, delete "device";

line 49, delete "ration" and insert --ratio--.

Col. 2, line 24, delete "shcematic" and insert --schematic--;

Signed and Sealed this

Twenty-second Day of December, 1992

Attest:

DOUGLAS B. COMER

Attesting Officer       Acting Commissioner of Patents and Trademarks